(12) United States Patent
Lerner

(10) Patent No.: US 11,124,184 B2
(45) Date of Patent: Sep. 21, 2021

(54) REAL-TIME VEHICLE ACCIDENT PREDICTION, WARNING, AND PREVENTION

(71) Applicant: TOYOTA MOTOR NORTH AMERICA, INC., Plano, TX (US)

(72) Inventor: Emily Lerner, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 210 days.

(21) Appl. No.: 16/186,098

(22) Filed: Nov. 9, 2018

(65) Prior Publication Data

US 2020/0148200 A1    May 14, 2020

(51) Int. Cl.
| | |
|---|---|
| *B60W 30/09* | (2012.01) |
| *B60W 30/095* | (2012.01) |
| *B60W 50/14* | (2020.01) |
| *G08G 1/16* | (2006.01) |
| *G05D 1/00* | (2006.01) |
| *G05D 1/02* | (2020.01) |
| *G06N 20/00* | (2019.01) |

(52) U.S. Cl.
CPC ........ *B60W 30/09* (2013.01); *B60W 30/0953* (2013.01); *B60W 30/0956* (2013.01); *B60W 50/14* (2013.01); *G05D 1/0088* (2013.01); *G05D 1/0221* (2013.01); *G06N 20/00* (2019.01); *G08G 1/162* (2013.01); *G08G 1/166* (2013.01); *B60W 2050/143* (2013.01)

(58) Field of Classification Search
CPC ............ B60W 30/09; B60W 30/0953; B60W 30/0956; B60W 50/14; B60W 2050/143; G06N 20/00; G06N 7/005; G08G 1/166; G08G 1/162; G08G 1/01; G08G 1/16; G05D 1/0088; G05D 1/0221
USPC ........................................................ 701/301
See application file for complete search history.

(56) References Cited

U.S. PATENT DOCUMENTS

| | | | |
|---|---|---|---|
| 9,177,477 B2 | 11/2015 | Mochizuki | |
| 9,214,086 B1 * | 12/2015 | Onishi | ............. G08G 1/096716 |
| 9,586,581 B2 | 3/2017 | Strauss | |
| 2017/0096105 A1 | 4/2017 | Israelsson | |
| 2018/0151074 A1 | 5/2018 | Noto | |

\* cited by examiner

*Primary Examiner* — Maceeh Anwari
(74) *Attorney, Agent, or Firm* — Sheppard, Mullin, Richter & Hampton LLP; Hector A. Agdeppa; Daniel N. Yannuzzi

(57) ABSTRACT

A vehicle and a method for the vehicle to detect a vehicle accident are provided. The method includes accessing at least one accident profile, wherein each accident profile contains information describing, for vehicles involved in a vehicle accident, data indicating vehicle operating parameters during the accident; collecting, in real time, data from the vehicle and at least one nearby vehicle, the data describing current vehicle operating parameters for the vehicles; comparing the data collected in real time with the at least one accident profile to determine a probability of a vehicle crash; and implementing preventive action responsive to the probability of a vehicle crash exceeds a probability threshold.

17 Claims, 6 Drawing Sheets

REAL-TIME VEHICLE ACCIDENT PREDICTION, WARNING, AND PREVENTION

TECHNICAL FIELD

The present disclosure relates generally to vehicles. In particular, embodiments of the present disclosure relate to vehicle accident prediction, warning, and prevention.

DESCRIPTION OF RELATED ART

Despite recent advancements in vehicle control systems, vehicle accidents continue to plague drivers, passengers, and bystanders. Vehicle accidents remain a leading cause of death and injury. It is of course highly desirable to reduce, or even eliminate, vehicle accidents.

BRIEF SUMMARY OF THE DISCLOSURE

In general, one aspect disclosed features a method for a vehicle to detect a vehicle accident, the method comprising: accessing at least one accident profile, wherein each accident profile contains information describing, for vehicles involved in a vehicle accident, data indicating vehicle operating parameters during the accident; collecting, in real time, data from the vehicle and at least one nearby vehicle, the data describing current vehicle operating parameters for the vehicles; comparing the data collected in real time with the at least one accident profile to determine a probability of a vehicle crash; and implementing preventive action responsive to the probability of a vehicle crash exceeds a probability threshold.

Embodiments of the method may include one or more of the following features. In some embodiments, implementing preventive action responsive to the probability of a vehicle crash exceeds a probability threshold comprises at least one of: generating an alert for the occupants of the vehicle; and controlling one or more of the operational systems of the vehicle to prevent the vehicle crash. In some embodiments, controlling one or more of the operational systems of the vehicle to prevent the vehicle crash comprises at least one of: slowing the vehicle; altering a path of the vehicle; and stopping the vehicle. Some embodiments comprise identifying the at least one nearby vehicle; accessing a vehicle profile for the at least one nearby vehicle, wherein each vehicle profile represents a history of the respective vehicle; and comparing the vehicle profile and the data collected in real time with the at least one accident profile to determine the probability of the vehicle crash. Some embodiments comprise identifying a driver of the at least one nearby vehicle; accessing at least one driver profile for each driver, wherein each driver profile represents a history of the respective driver; and comparing the at least one driver profile and the data collected in real time with the at least one accident profile to determine the probability of the vehicle crash. Some embodiments comprise collecting, in real time, from the vehicle, data describing environment parameters of the vehicle; comparing the data collected in real time with the at least one accident profile to determine the probability of the vehicle crash. Some embodiments comprise generating the one or more accident profiles, the generating comprising: for each of a plurality of accidents, receiving and storing sensor data from a plurality of vehicle sensors indicating values of vehicle operating parameters during each accident; applying a machine learning algorithm to the data to identify the vehicle operating parameters and values that are indicative of the accident; and generating a profile representing the identified vehicle operating parameters and values.

In general, one aspect disclosed features a vehicle comprising: a processor; and a non-transitory machine-readable storage medium encoded with instructions executable by the processor, the machine-readable storage medium comprising instructions to cause the processor to perform a method comprising: accessing at least one accident profile, wherein each accident profile contains information describing, for vehicles involved in a vehicle accident, data indicating vehicle operating parameters during the accident; collecting, in real time, data from the vehicle and at least one nearby vehicle, the data describing current vehicle operating parameters for the vehicles; comparing the data collected in real time with the at least one accident profile to determine a probability of a vehicle crash; and implementing preventive action responsive to the probability of a vehicle crash exceeds a probability threshold.

Embodiments of the vehicle may include one or more of the following features. In some embodiments, implementing preventive action responsive to the probability of a vehicle crash exceeds a probability threshold comprises at least one of: generating an alert for the occupants of the vehicle; and controlling one or more of the operational systems of the vehicle to prevent the vehicle crash. In some embodiments, controlling one or more of the operational systems of the vehicle to prevent the vehicle crash comprises at least one of: slowing the vehicle; altering a path of the vehicle; and stopping the vehicle. In some embodiments, the method further comprises: identifying the at least one nearby vehicle; accessing a vehicle profile for the at least one nearby vehicle, wherein each vehicle profile represents a history of the respective vehicle; and comparing the vehicle profile and the data collected in real time with the at least one accident profile to determine the probability of the vehicle crash. In some embodiments, the method further comprises: identifying a driver of the at least one nearby vehicle; accessing at least one driver profile for each driver, wherein each driver profile represents a history of the respective driver; and comparing the at least one driver profile and the data collected in real time with the at least one accident profile to determine the probability of the vehicle crash. In some embodiments, the method further comprises: collecting, in real time, from the vehicle, data describing environment parameters of the vehicle; comparing the data collected in real time with the at least one accident profile to determine the probability of the vehicle crash.

In general, one aspect disclosed features a non-transitory machine-readable storage medium encoded with instructions executable by a hardware processor of a computing component of a vehicle, the machine-readable storage medium comprising instructions to cause the hardware processor to perform a method comprising: accessing at least one accident profile, wherein each accident profile contains information describing, for vehicles involved in a vehicle accident, data indicating vehicle operating parameters during the accident; collecting, in real time, data from the vehicle and at least one nearby vehicle, the data describing current vehicle operating parameters for the vehicles; comparing the data collected in real time with the at least one accident profile to determine a probability of a vehicle crash; and implementing preventive action responsive to the probability of a vehicle crash exceeds a probability threshold.

Embodiments of the medium may include one or more of the following features. In some embodiments, implementing preventive action responsive to the probability of a vehicle crash exceeds a probability threshold comprises at least one of: generating an alert for the occupants of the vehicle; and controlling one or more of the operational systems of the vehicle to prevent the vehicle crash. In some embodiments, controlling one or more of the operational systems of the vehicle to prevent the vehicle crash comprises at least one of: slowing the vehicle; altering a path of the vehicle; and stopping the vehicle. In some embodiments, the method further comprises: identifying the at least one nearby vehicle; accessing a vehicle profile for the at least one nearby vehicle, wherein each vehicle profile represents a history of the respective vehicle; and comparing the vehicle profile and the data collected in real time with the at least one accident profile to determine the probability of the vehicle crash. In some embodiments, the method further comprises: identifying a driver of the at least one nearby vehicle; accessing at least one driver profile for each driver, wherein each driver profile represents a history of the respective driver; and comparing the at least one driver profile and the data collected in real time with the at least one accident profile to determine the probability of the vehicle crash. In some embodiments, the method further comprises: collecting, in real time, from the vehicle, data describing environment parameters of the vehicle; comparing the data collected in real time with the at least one accident profile to determine the probability of the vehicle crash. In some embodiments, the method further comprises generating the one or more accident profiles, the generating comprising: for each of a plurality of accidents, receiving and storing sensor data from a plurality of vehicle sensors indicating values of vehicle operating parameters during each accident; applying a machine learning algorithm to the data to identify the vehicle operating parameters and values that are indicative of the accident; and generating a profile representing the identified vehicle operating parameters and values.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments are directed to systems and methods for automatic vehicle accident prediction, warning, and prevention. In some embodiments, the system uses accident profiles to predict accidents. Each accident profile contains information describing, for vehicles involved in a vehicle accident, data indicating vehicle operating parameters during the accident. The system also collects real-time data from the vehicle and at least one nearby vehicle. The data describes current vehicle operating parameters for the vehicles. The system compares the data collected in real time with the accident profiles to determine a probability of a vehicle crash. The system takes preventive action when the probability of a vehicle crash exceeds a probability threshold. In some embodiments, the system generates an alert for the occupants of the vehicle. In some embodiments, the system controls one or more of the operational systems of the vehicle to prevent the vehicle crash. For example, the system may slow the vehicle, alter a path of the vehicle, stop the vehicle, and the like.

In some embodiments, the system uses vehicle profiles to predict accidents. The system identifies nearby vehicles, and then accesses a vehicle profile for each identified vehicle. Each vehicle profile represents a history of the respective vehicle. The system then compares the vehicle profiles and the data collected in real time with the accident profiles to determine the probability of a vehicle crash.

In some embodiments, the system uses driver profiles to predict accidents. The system identifies drivers of nearby vehicles, and then accesses a driver profile for each identified driver. Each driver profile represents a history of the respective driver. For example, the history may include a driving record of the driver. The system then compares the driver profiles and the data collected in real time with the accident profiles to determine the probability of a vehicle crash.

In some embodiments, the system collects real-time data describing environment parameters of the vehicle. For example, the environment parameters may represent weather conditions, road conditions, and the like. The system then compares the data collected in real time with the accident profiles to determine the probability of a vehicle crash.

In some embodiments, the system generates the accident profiles. For each of a plurality of accidents, the system receives and stores sensor data from a plurality of vehicle sensors indicating values of vehicle operating parameters during each accident. The system applies a machine learning algorithm to the data to identify the vehicle operating parameters and values that are indicative of the accident. The system generates the accident profile to represent the identified vehicle operating parameters and values.

Figure 1:
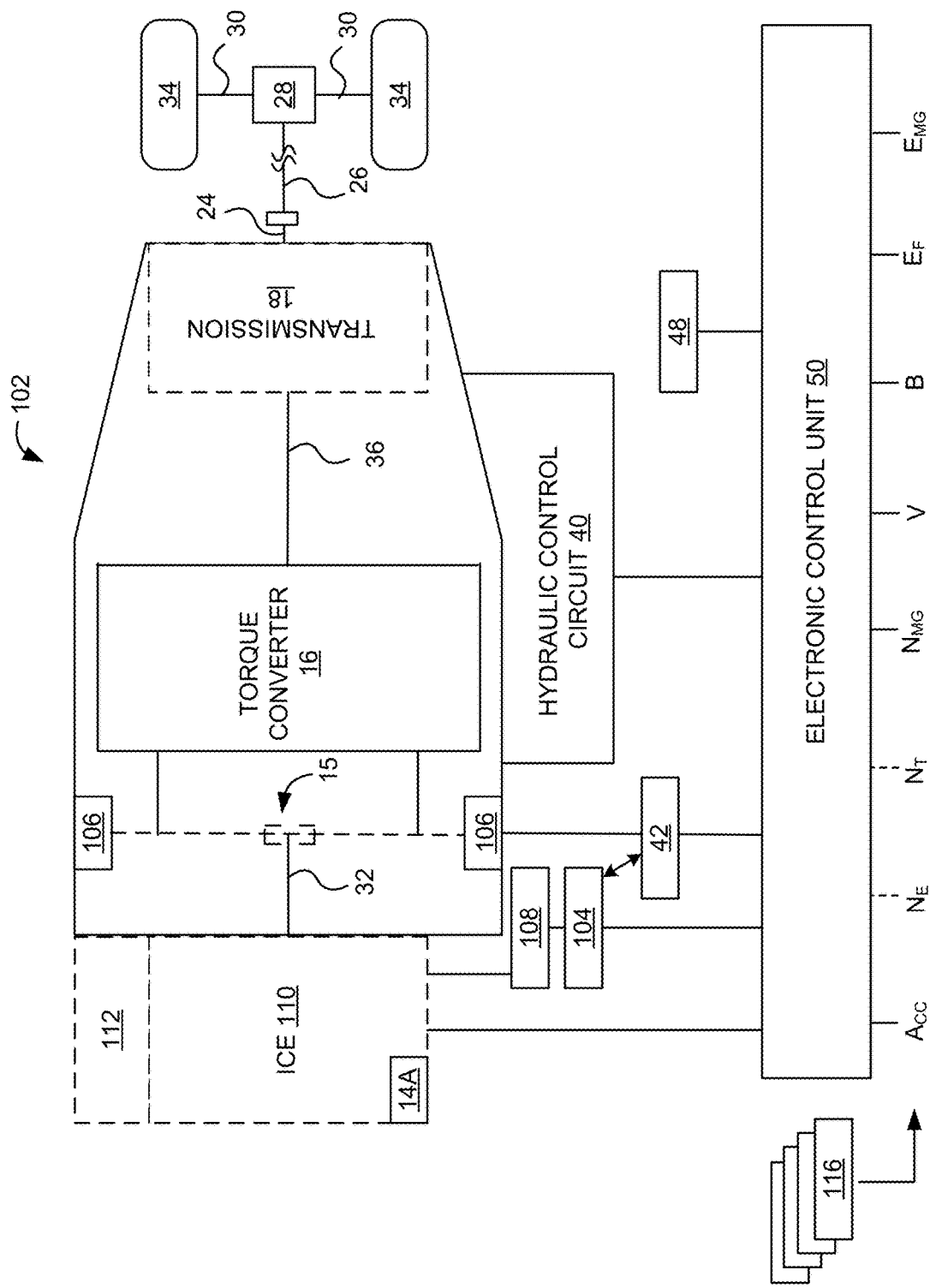
FIG. 1 illustrates an example vehicle in which embodiments of the disclosed technology may be implemented.

An example vehicle 102 in which embodiments of the disclosed technology may be implemented is illustrated in FIG. 1. The vehicle depicted in FIG. 1 is a hybrid electric vehicle. However, the disclosed technology is independent of the means of propulsion of the vehicle, and so applies equally to vehicles without an electric motor, and to vehicles without an internal combustion engine.

FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 110 (engine RPM), a rotational speed, NMG, of the motor 106 (motor rotational speed), and vehicle speed, NV. These may also include torque converter 16 output, NT (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to engine control unit 50 (which, again, may be implemented as one or a plurality of individual control circuits). In one embodiment, sensors 116 may be included to detect one or more conditions directly or indirectly such as, for example, fuel efficiency, EF, motor efficiency, EMG, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, the presence or absence of a road shoulder and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
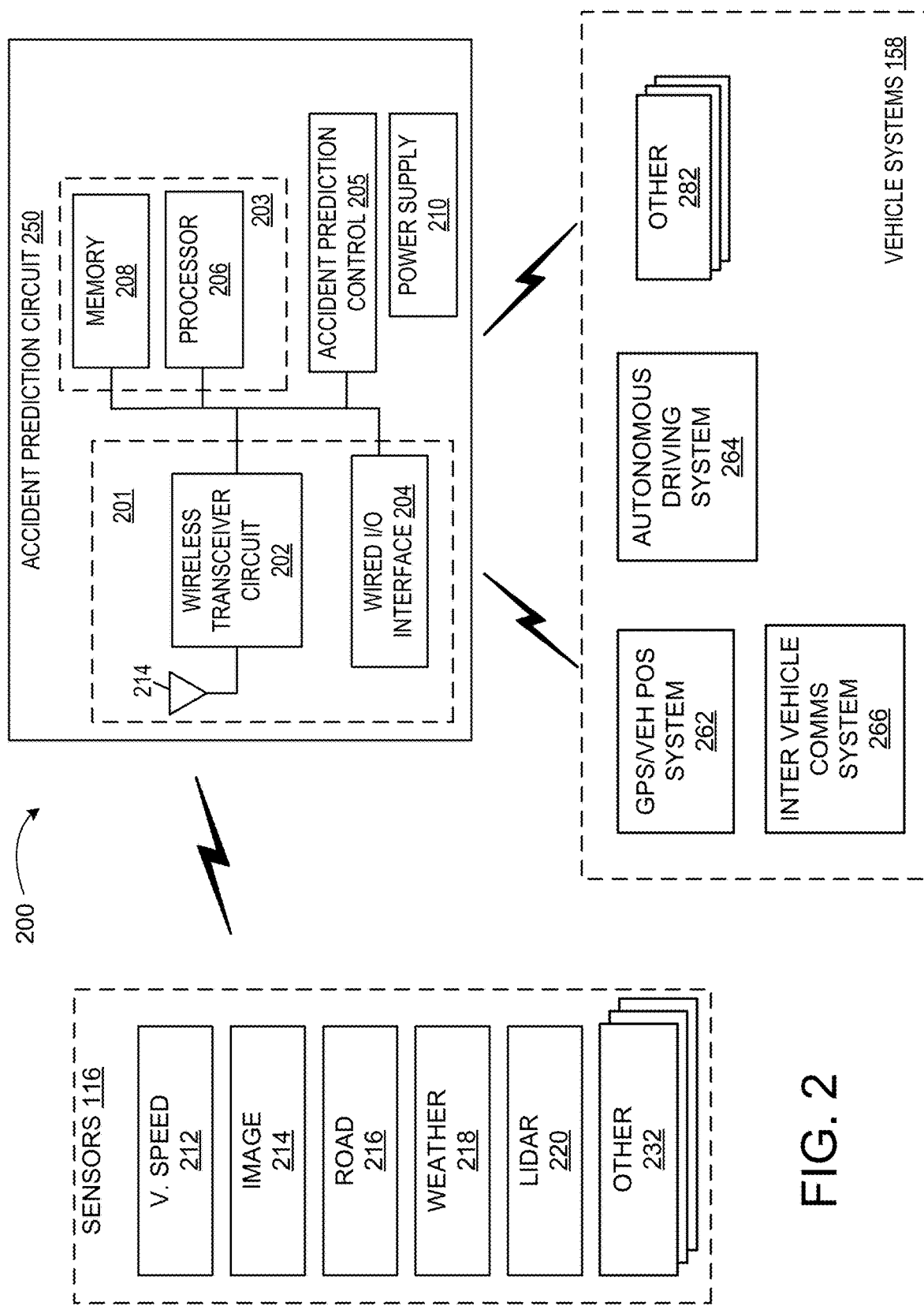
FIG. 2 illustrates an example architecture for modifying the route of an autonomous vehicle in accordance with one embodiment

FIG. 2 illustrates an example architecture for vehicle accident prediction, warning, and prevention in accordance with one embodiment of the systems and methods described herein. Referring now to FIG. 2, in this example, a vehicle accident prediction system 200 includes an accident prediction circuit 250, a plurality of sensors 116, and a plurality of vehicle systems 158. Sensors 116 and vehicle systems 158 can communicate with accident prediction circuit 250 via a wired or wireless communication interface. Although sensors 116 and vehicle systems 158 are depicted as communicating with accident prediction circuit 250, they can also communicate with each other as well as with other vehicle systems. Accident prediction circuit 250 can be implemented as an ECU or as part of an ECU such as, for example electronic control unit 50. In other embodiments, accident prediction circuit 250 can be implemented independently of the ECU.

Accident prediction circuit 250 in this example includes a communication circuit 201, a processing circuit 203 (including a processor 206 and memory 208 in this example) and a power supply 210. Components of accident prediction circuit 250 are illustrated as communicating with each other via a data bus, although other communication interfaces can be included. Accident prediction circuit 250 in this example also includes an accident prediction control 205 that can be operated by the user to control the accident prediction circuit 250, for example by manual controls, voice, and the like.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to operate accident prediction circuit 250.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an accident prediction circuit 250.

Communication circuit 201 either or both a wireless transceiver circuit 202 with an associated antenna 214 and a wired I/O interface 204 with an associated hardwired data port (not illustrated). As this example illustrates, communications with accident prediction circuit 250 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by accident prediction circuit 250 to/from other entities such as sensors 116 and vehicle systems 158.

Wired I/O interface 204 can include a transmitter and a receiver (not shown) for hardwired communications with other devices. For example, wired I/O interface 204 can provide a hardwired interface to other components, including sensors 116 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, NiH2, rechargeable, primary battery, etc.), a power connector (e.g., to connect to vehicle supplied power, etc.), an energy harvester (e.g., solar cells, piezoelectric system, etc.), or include any other suitable power supply.

Sensors 116 may include additional sensors that may or not otherwise be included on a standard vehicle 102 with which the accident prediction system 200 is implemented. In the illustrated example, sensors 116 include vehicle speed sensor 222, image sensor 224, road sensor 226, weather sensor 228, and clock 230. Additional sensors 232 can also be included as may be appropriate for a given implementation of accident prediction system 200.

Vehicle systems 158 can include any of a number of different vehicle components or subsystems used to control or monitor various aspects of the vehicle and its performance. In this example, the vehicle systems 158 include a vehicle position system 272, an autonomous driving system 274, an inter-vehicle communications system 276, and other vehicle systems 282. Vehicle position system 272 may determine a geographic position of the vehicle, as well as its direction and speed. Vehicle position system 272 may include a global positioning satellite (GPS) system or the like. The autonomous driving system 274 may operate the vehicle 102 in autonomous driving modes including Level 2 and Level 3 modes. The inter-vehicle communications system 276 performs automatic vehicle-to-vehicle radio communications to exchange data as described herein, and may include a dedicated short-range communications (DSRC) device or the like.

During operation, accident prediction circuit 250 can receive information from various vehicle sensors to determine whether the accident prediction mode should be activated. Also, the driver may manually activate the accident prediction mode by operating accident prediction control 205. Communication circuit 201 can be used to transmit and receive information between accident prediction circuit 250 and sensors 116, and accident prediction circuit 250 and vehicle systems 158. Also, sensors 116 may communicate with vehicle systems 158 directly or indirectly (e.g., via communication circuit 201 or otherwise).

In various embodiments, communication circuit 201 can be configured to receive data and other information from sensors 116 that is used in determining whether to activate the accident prediction mode. Additionally, communication circuit 201 can be used to send an activation signal or other activation information to various vehicle systems 158 as part of entering the accident prediction mode. For example, as described in more detail below, communication circuit 201 can be used to send signals to, for example, the autonomous driving system 274. Examples of this are described in more detail below.

Figure 3:
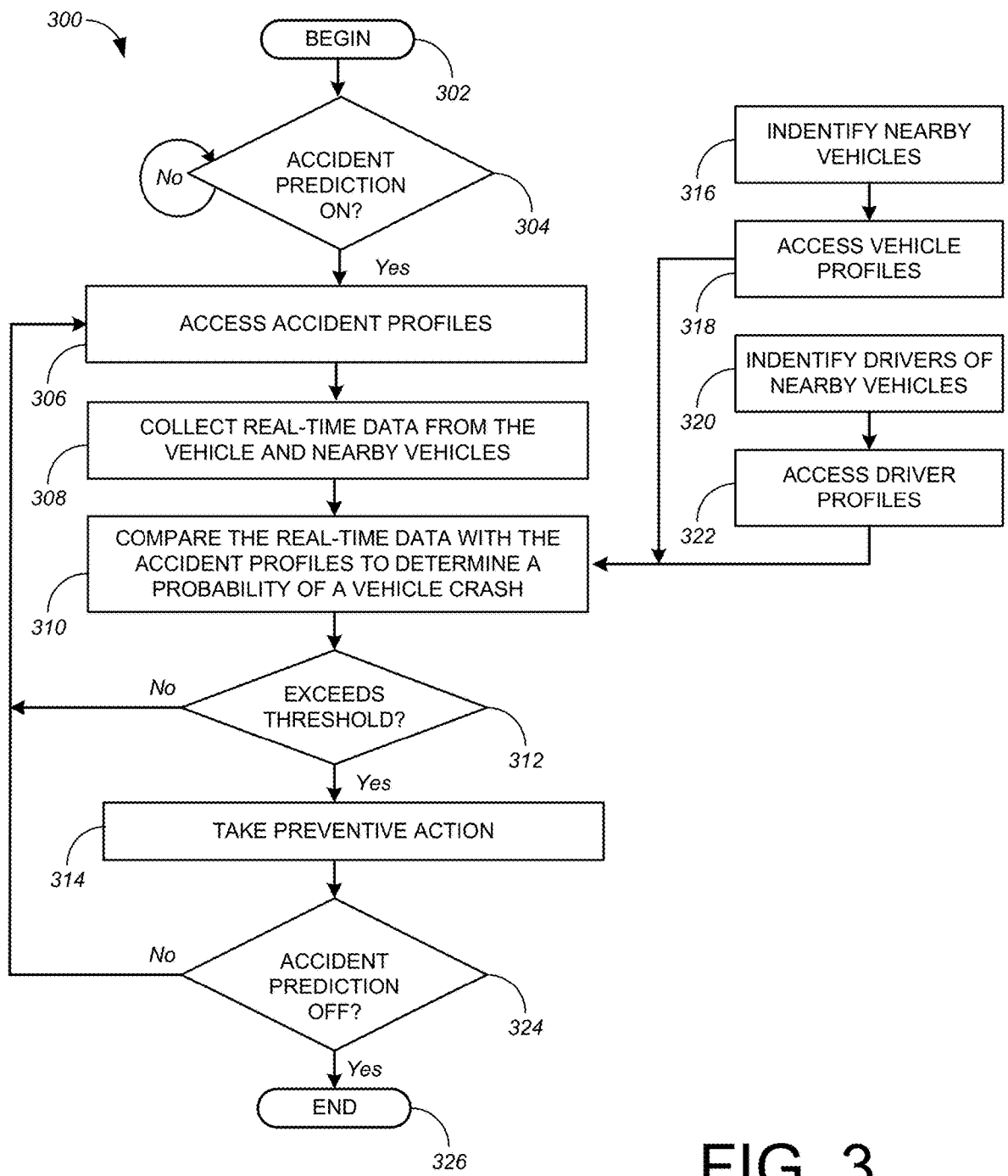
FIG. 3 is a flowchart illustrating a process for vehicle accident prediction, warning, and prevention according to one embodiment.

FIG. 3 is a flowchart illustrating a process 300 for vehicle accident prediction, warning, and prevention according to one embodiment. Referring to FIG. 3, the process 300 begins, at 302. The accident prediction circuit 250 first determines whether the accident prediction mode is on, at 304. This may include determining whether the accident prediction mode has been activated, for example manually by the driver using the accident prediction control 205. The accident prediction circuit 250 continues this determination until the accident prediction mode is activated.

When the accident prediction mode is active, the accident prediction circuit 250 accesses at least one accident profile, at 306. Each accident profile contains information describing, for vehicles involved in a vehicle accident, data indicating vehicle operating parameters during the accident. For example, the vehicle operating parameters may include vehicle speed and impact, loss of traction, operation of vehicle controls such as brakes, accelerator, steering, turn signals, airbag deployment, and the like. Each profile may also contain information describing environment parameters at the time and place of the accident. For example, the environment parameters may include weather conditions, road conditions, and the like. The accident profiles may be stored locally, for example in the memory 208 of the accident prediction circuit 250. The accident profiles may be updated from the cloud.

Figure 4:
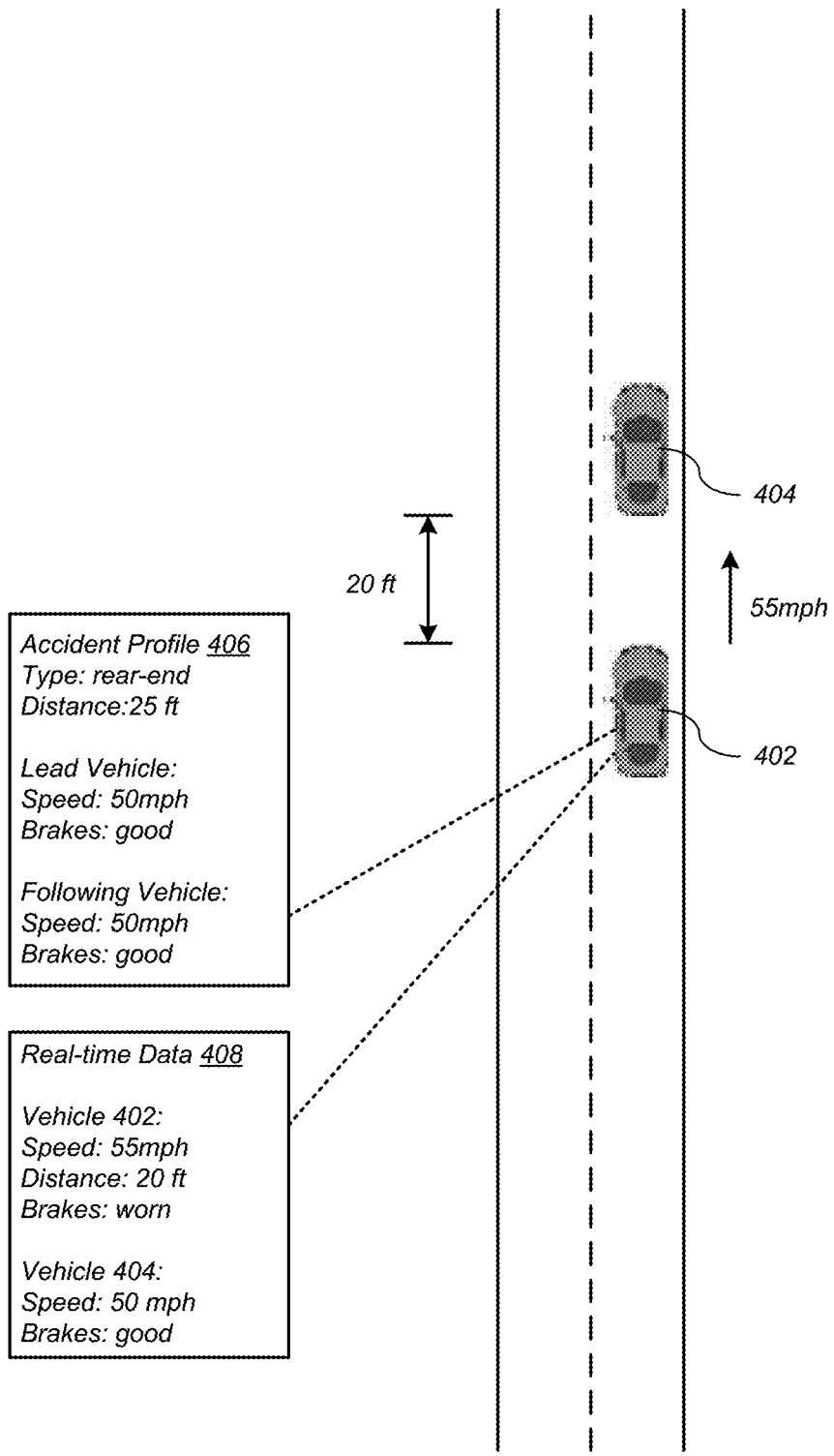
FIG. 4 illustrates a scenario where a subject vehicle is following a nearby vehicle.

FIG. 4 illustrates a scenario where a subject vehicle 402 is following a nearby vehicle 404. Referring to FIG. 4, an accident profile 406 accessed by the subject vehicle 402 indicates a type of collision as rear-end, and a following distance prior to the collision of 25 feet. The accident profile 406 also indicates, for the lead vehicle in the accident, a speed of 50 mph, and a good condition of the brakes. For the following vehicle in the accident, the accident profile 406 indicates a speed of 50 mph, and a good condition of the brakes.

When the accident prediction mode is active, the accident prediction circuit 250 collects, in real time, data from the vehicle 102 and nearby vehicles, at 308. The data may describe current vehicle operating parameters for the vehicles. The vehicle operating parameters may include those described above for the accident profiles. The data may be collected using vehicle-to-vehicle communications. For example, the data may be collected by inter-vehicle communications system 276. The data collected from other vehicles may include data regarding the condition of the vehicle. For example, the data may indicate a vehicle is old, has bald tires and bad brakes, has rear-wheel drive, and the like. The data collected from other vehicles may include data regarding the operation of the vehicle. For example, the data may indicate erratic driving, for example such as frequent departures from the vehicle's travel lane, sudden accelerations, and the like.

Referring again to the example of FIG. 4, the real-time data 408 collected by the subject vehicle 402 indicates, for the subject vehicle 402, a speed of 55 mph, a following distance of 20 feet, and a worn condition of the brakes of the vehicle 402. Real-time data 408 also indicates, for the nearby vehicle 404, a speed of 50 mph, and a good condition of the brakes.

The accident prediction circuit 250 then compares the data collected in real time with the accident profiles to determine a probability of a vehicle crash, at 310. Any sort of comparison method may be used. For example, the values of the real-time data may be compared with the values of the data in the accident profiles to determine a best-matching profile, and a probability of the accident described by the profile taking place. In the example of FIG. 4, the accident profile 406 is a good match for the real-time data 408. In fact, the scenario illustrated by the real-time data 408 is even worse than the scenario described in the accident profile 406. In particular, the speeds are greater, the following distance is less, and the brakes of the vehicle 402 are worn, requiring a greater stopping distance. In response to this match, the accident prediction circuit 250 may assign a very high probability of a rear-end collision.

The accident prediction circuit 250 may compare the predicted probability of an accident to an accident probability threshold, at 312. When the probability of a vehicle crash exceeds the probability threshold, the accident prediction circuit 250 takes preventive action, at 314. The preventive action may include generating an alert for the occupants of the vehicle 102, controlling one or more of the operational systems of the vehicle to prevent the vehicle crash, and the like. For example, the accident prediction circuit 250 may slow the vehicle 102, alter a path of the vehicle 102, stop the vehicle 102, and the like. Continuing the example of FIG. 4, the accident prediction circuit 250 may slow the vehicle 402 so that its speed and following distance no longer match the accident profile 406.

In some embodiments, the accident prediction circuit 250 may employ a vehicle profile. Each vehicle profile represents a history of a particular vehicle. The history may include a repair history for the vehicle, a maintenance history for the vehicle, a crash history of the vehicle, insurance claims made for the vehicle, law enforcement records for the vehicle, and the like. In such embodiments, the accident prediction circuit 250 identifies nearby vehicles, at 316. The vehicles may be identified in any manner. For example, image sensor 214 may capture a license plate number of the vehicle. As another example, the vehicle may identify itself through the use of inter-vehicle communications. The accident prediction circuit 250 may use the identity of the vehicle to access its vehicle profile, at 318. For example, the accident prediction circuit 250 may retrieve the vehicle profile from the cloud. The accident prediction circuit 250 then employs the vehicle profile to determine the probability of a vehicle crash, at 310. For example, the accident prediction circuit may compare the vehicle profile and the data collected in real time with the accident profile to determine the probability of a vehicle crash.

In some embodiments, the accident prediction circuit 250 may employ a driver profile. Each driver profile represents a history of a particular vehicle. The history may include a driving record of the driver, insurance claims made by the driver, law enforcement records for the driver, and the like. The driver profile may indicate a current condition of the driver. For example, the data may indicate that the driver has been driving for several hours today. The driver profile may relate the driver to the vehicle. For example, the driver may be unfamiliar with the vehicle because it was recently purchased by the driver, or because it is a rental vehicle. The driver profile may indicate an experience level of the driver. For example, the driver may be young and/or recently licensed to drive. As another example, the driver may be unfamiliar with driving in the snow.

In such embodiments, the accident prediction circuit 250 identifies drivers of nearby vehicles, at 320. The drivers may be identified in any manner. For example, the image sensor 214 of the vehicle 102 may capture an image of the driver's face, and facial recognition may be used to identify the driver. As another example, the driver may be identified through the use of inter-vehicle communications. For example, the driver's vehicle may identify the driver, and broadcast the information. The accident prediction circuit 250 may use the identity of the driver to access the driver's driver profile, at 322. For example, the accident prediction circuit 250 may retrieve the driver profile from the cloud. The accident prediction circuit 250 then employs the driver profile to determine the probability of a vehicle crash, at 310. For example, the accident prediction circuit may compare the driver profile and the data collected in real time with the accident profile to determine the probability of the vehicle crash.

The accident prediction circuit 250 occasionally determines whether the accident prediction mode has been deactivated, at 324. While the accident prediction mode is active, the accident prediction circuit 250 continues to predict accidents. When the accident prediction mode is deactivated, the process 300 ends, at 326.

Figure 5:
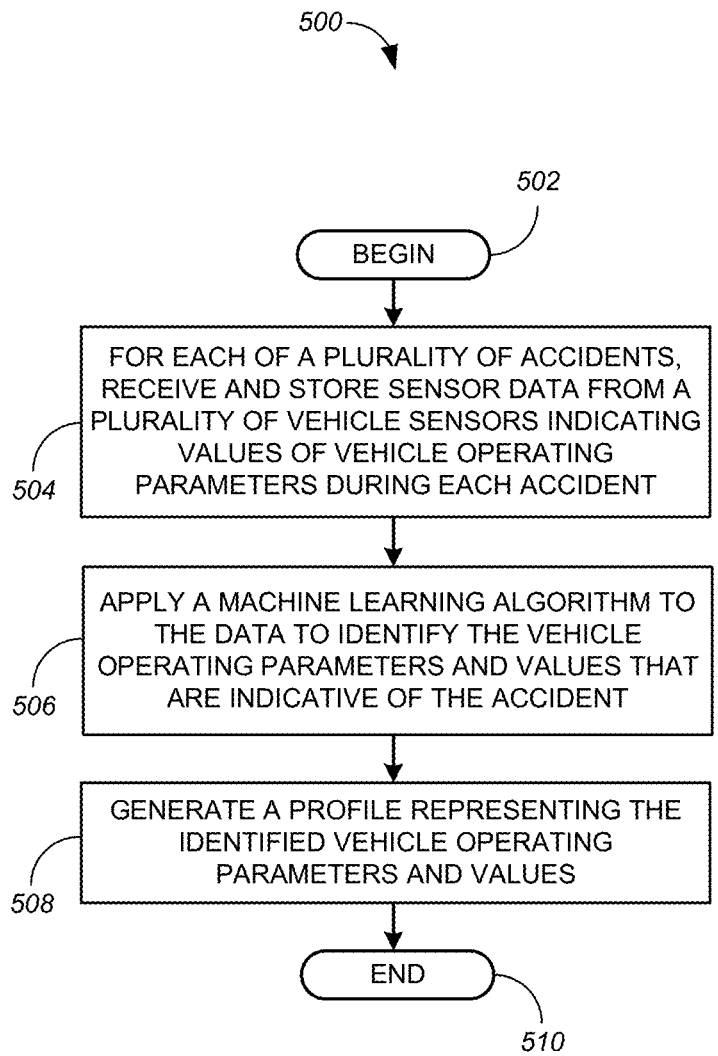
FIG. 5 is a flowchart illustrating a process for generating accident profiles according to one embodiment.

FIG. 5 is a flowchart illustrating a process 500 for generating accident profiles according to one embodiment. Referring to FIG. 5, the process 500 begins, at 502. Process 500 includes, for a plurality of accidents, receiving and storing sensor data from a plurality of vehicle sensors indicating values of vehicle operating parameters during each accident, at 504. The vehicle operating parameters may be as described above. The data may be collected from various sources, including vehicle "black boxes" that record data before and during an accident, law enforcement records, stationary sensors such as traffic light cameras, insurance records, and the like. The data may include real-time data describing environment parameters at the time of the accident. The environment parameters may be as described above.

The process may apply a machine learning algorithm to the data to identify the vehicle operating parameters and values that are indicative of the accident, at 506. This process may include environment parameters. The process 500 generates one or more accident profiles, at 508. The profiles may represent the identified vehicle operating parameters and values. Following generation of the accident profiles, the process 500 ends, at 510.

In some embodiments, the machine learning algorithm may run specified software on a cloud server infrastructure, may be configured to train and improve the algorithm. The algorithm adaptation may use data collected from a multitude of vehicles (i.e., the "Big Data" approach), which optimizes the algorithm in a way not possible with data provided by only a single user. "Big Data" typically includes data sets with sizes beyond the ability of commonly used software tools to capture, curate, manage, and process data within a tolerable elapsed time. Big data "size" is a constantly moving target, but can range from a few dozen terabytes to many petabytes of data. Big data is a set of techniques and technologies that employ new forms of integration to uncover large hidden values from large datasets that are diverse, complex, and of a massive scale.

The algorithm is trained using a training dataset as each data point gathered from the multitude of vehicles is fed into the current algorithm and compared with a desired outcome. If the outcome deviates, the parameters of the algorithms are changed slightly through a statistical optimization calculation to improve the outcome. After each iteration of the training set the algorithm is evaluated using a test set. This process is repeated until the overall algorithm demonstrates improved performance.

Figure 6:
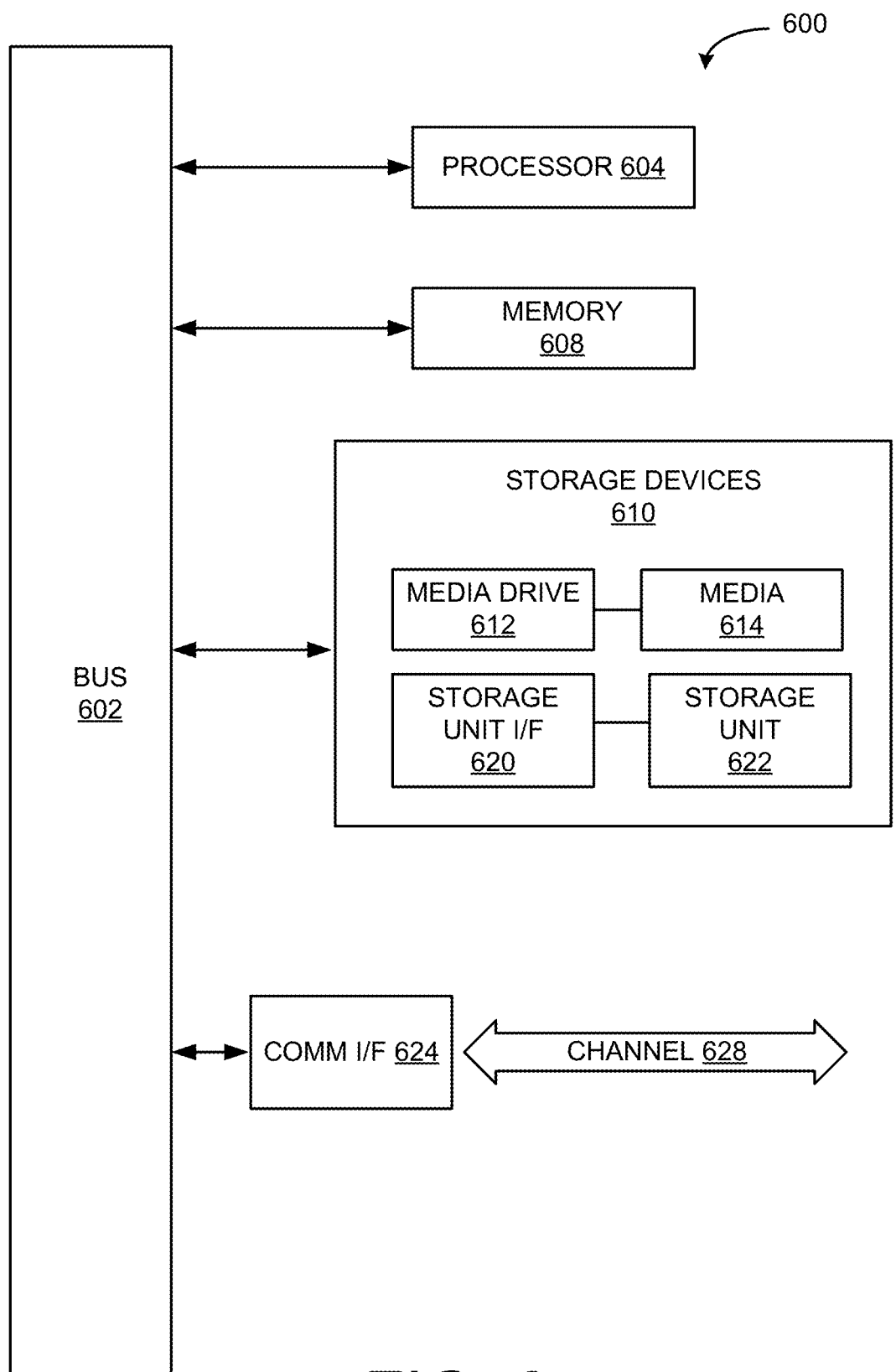
FIG. 6 shows an example computing component capable of carrying out the functionality described with respect thereto.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up hybrid vehicle 102 and its component parts, for example such as the computing component. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for a first vehicle to detect a future vehicle accident, the method comprising:
    accessing an accident profile of a second vehicle, wherein the accident profile contains data indicating vehicle operating parameters during a prior vehicle accident;
    collecting current vehicle operating parameters from the first vehicle and the second vehicle, the current vehicle operating parameters being collected in real time;
    based on a comparison between the current vehicle operating parameters and the accident profile of the second vehicle, determine a probability of the future vehicle accident; and
    implementing preventive action responsive to the probability of the future vehicle accident exceeds a probability threshold;
    wherein implementing preventive action responsive to the probability of the future vehicle accident exceeds the probability threshold comprises at least one of: generating an alert for occupants of the second vehicle; and controlling one or more operational systems of first vehicle to prevent the future vehicle accident.

2. The method of claim 1, wherein controlling one or more of the operational systems of the first vehicle to prevent the future vehicle accident comprises at least one of: slowing the first vehicle; altering a path of the first vehicle; and stopping the first vehicle.

3. The method of claim 1,
    wherein the current vehicle operating parameters are data collected in real time.

4. The method of claim 1, further comprising:
    identifying a driver of the second vehicle;
    accessing a driver profile for the driver, wherein the driver profile represents a history of the driver; and
    comparing the driver profile and data collected in real time to determine the probability of the future vehicle accident.

5. The method of claim 1, further comprising:
    collecting, in real time, from the second vehicle, data describing environment parameters of the second vehicle;
    comparing data collected in real time with the data describing environment parameters of the second vehicle to determine the probability of the future vehicle accident.

6. The method of claim 1, further comprising generating one or more accident profiles, the generating comprising:
    for each of a plurality of accidents, receiving and storing sensor data from a plurality of vehicle sensors indicating values of vehicle operating parameters during each accident;
    applying a machine learning algorithm to the data to identify the vehicle operating parameters and values that are indicative of the accident; and
    generating a profile representing the identified vehicle operating parameters and values.

7. A first vehicle comprising: a processor; and a non-transitory machine-readable storage medium encoded with instructions executable by the processor, the machine-readable storage medium comprising instructions to cause the processor to perform a method comprising:
    accessing an accident profile of a second vehicle, wherein the accident profile contains data indicating vehicle operating parameters during a prior vehicle accident;
    collecting current vehicle operating parameter from the first vehicle and the second vehicle, the current vehicle operating parameters being collected in real time;
    based on a comparison between the current vehicle operating parameters and the accident profile of the second vehicle, determine a probability of a future vehicle accident; and
    implementing preventive action responsive to the probability of a future vehicle accident exceeds a probability threshold;
    wherein implementing preventive action responsive to the probability of the future vehicle accident exceeds the probability threshold comprises at least one of: generating an alert for occupants of the second vehicle; and controlling one or more operational systems of the first vehicle to prevent the future vehicle accident.

8. The first vehicle of claim 7, wherein controlling one or more of the operational systems of the first vehicle to prevent the future vehicle accident comprises at least one of: slowing the first vehicle; altering a path of the first vehicle; and stopping the first vehicle.

9. The first vehicle of claim 7, wherein
    the current vehicle operating parameters are data collected in real time.

10. The first vehicle of claim 7, wherein the method further comprises:
    identifying a driver of the second vehicle;
    accessing a driver profile for the driver, wherein the driver profile represents a history of the driver; and
    comparing the driver profile and data collected in real time to determine the probability of the future vehicle accident.

11. The first vehicle of claim 7, wherein the method further comprises:

collecting, in real time, from the second vehicle, data describing environment parameters of the second vehicle; and comparing data collected in real time with the data describing environment parameters of the second vehicle to determine the probability of the future vehicle accident.

12. A non-transitory machine-readable storage medium encoded with instructions executable by a hardware processor of a computing component of a first vehicle, the machine-readable storage medium comprising instructions to cause the hardware processor to perform a method comprising:

accessing an accident profile of a second vehicle, wherein the accident profile contains data indicating vehicle operating parameters during a prior vehicle accident;

collecting current vehicle operating parameter from the first vehicle and the second vehicle, the current vehicle operating parameters being collected in real time;

based on a comparison between the current vehicle operating parameters and the accident profile of the second vehicle, determine a probability of a future vehicle accident; and implementing preventive action responsive to the probability of a future vehicle accident exceeds a probability threshold;

wherein implementing preventive action responsive to the probability of the future vehicle accident exceeds the probability threshold comprises at least one of: generating an alert for occupants of the second vehicle; and controlling one or more operational systems of the second vehicle to prevent the future vehicle accident.

13. The medium of claim 12, wherein controlling one or more of the operational systems of the first vehicle to prevent the future vehicle accident comprises at least one of: slowing the first vehicle; altering a path of the first vehicle; and stopping the first vehicle.

14. The medium of claim 12, wherein the current vehicle operating parameters are data collected in real time.

15. The medium of claim 12, wherein the method further comprises:

identifying a driver of the second vehicle;

accessing a driver profile for the driver, wherein the driver profile represents a history of the driver; and comparing the driver profile and data collected in real time to determine the probability of the future vehicle accident.

16. The medium of claim 12, wherein the method further comprises:

collecting, in real time, from the first vehicle, data describing environment parameters of the first vehicle;

comparing data collected in real time with the data describing environment parameters of the second vehicle to determine the probability of the future vehicle accident.

17. The medium of claim 12, wherein the method further comprises generating one or more accident profiles, the generating comprising:

for each of a plurality of accidents, receiving and storing sensor data from a plurality of vehicle sensors indicating values of vehicle operating parameters during each accident;

applying a machine learning algorithm to the data to identify the vehicle operating parameters and values that are indicative of the accident; and generating a profile representing the identified vehicle operating parameters and values.

* * * * *